United States Patent
Daniels et al.

(10) Patent No.: US 12,187,081 B2
(45) Date of Patent: Jan. 7, 2025

(54) TIRE PRESSURE MONITORING AND LOCATION SYSTEM WITH TIRE ROTATION SERVICE INDICATOR AND NEW LOCATION CONFIRMATION

(71) Applicant: GM GLOBAL TECHNOLOGY OPERATIONS LLC, Detroit, MI (US)

(72) Inventors: Richard P. Daniels, Lapeer, MI (US); Robert Kosi Tette, Oak Park, MI (US); Frederick J. Vondrak, Novi, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 254 days.

(21) Appl. No.: 17/851,616

(22) Filed: Jun. 28, 2022

(65) Prior Publication Data
US 2023/0415523 A1    Dec. 28, 2023

(51) Int. Cl.
*B60C 23/04* (2006.01)
*G07C 5/00* (2006.01)
*G07C 5/10* (2006.01)

(52) U.S. Cl.
CPC .......... *B60C 23/0416* (2013.01); *G07C 5/008* (2013.01); *G07C 5/10* (2013.01); *G07C 2205/02* (2013.01)

(58) Field of Classification Search
None
See application file for complete search history.

(56) References Cited

U.S. PATENT DOCUMENTS

| | | | | |
|---|---|---|---|---|
| 5,731,516 A | * | 3/1998 | Handfield | H01Q 1/2241 73/756 |
| 6,362,731 B1 | * | 3/2002 | Lill | B60C 23/0483 340/447 |
| 6,441,727 B1 | * | 8/2002 | LeMense | B60C 23/0416 340/447 |
| 9,541,419 B2 | * | 1/2017 | Borghesani | G07C 5/008 |
| 2003/0071723 A1 | * | 4/2003 | Tang | B60C 23/0416 340/445 |
| 2005/0256619 A1 | | 11/2005 | Hayashi | |
| 2012/0235807 A1 | | 9/2012 | Rysenga et al. | |
| 2019/0392401 A1 | * | 12/2019 | Bellini | G06Q 10/20 |
| 2020/0009920 A1 | | 1/2020 | Oki et al. | |

FOREIGN PATENT DOCUMENTS

| | | |
|---|---|---|
| DE | 102016102021 A1 | 8/2016 |
| DE | 102018102870 A1 | 8/2018 |
| DE | 102018129755 A1 | 5/2019 |
| JP | 2007112169 A | 5/2007 |

OTHER PUBLICATIONS

Office Action dated Jan. 27, 2023 from German Patent Office for German Patent Application No. 102022127842.5; 4 Pages.

* cited by examiner

*Primary Examiner* — Daniel L Greene

(57) ABSTRACT

A tire pressure and location monitoring system includes N tire pressure sensors associated with N tires of a vehicle, where N is an integer greater than one. A tire pressure and location monitoring system is configured to communicate with the N tire pressure sensors, store a tire rotation map, and determine whether new locations of the N tires, including the N tire pressure sensors, on the vehicle are correct after a tire rotation is performed based on the tire rotation map.

20 Claims, 4 Drawing Sheets

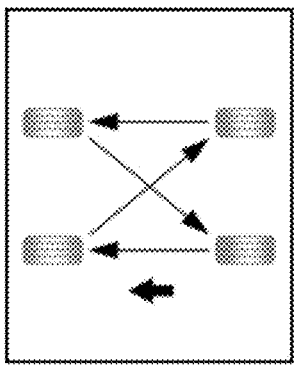

| Location | Initial | Initial +1 | Initial +2 | Initial +3 | Initial +4 | Initial +n |
|---|---|---|---|---|---|---|
| LEFT FRONT | LF INITIAL | LR INITIAL | RF INITIAL | RR INITIAL | LF INITIAL | |
| LEFT REAR | LR INITIAL | RF INITIAL | RR INITIAL | LF INITIAL | LR INITIAL | |
| RIGHT FRONT | RF INITIAL | RR INITIAL | LF INITIAL | LR INITIAL | RF INITIAL | |
| RIGHT REAR | RR INITIAL | LF INITIAL | LR INITIAL | RF INITIAL | RR INITIAL | |
| SPARE | SPARE INITIAL | SPARE INITIAL | SPARE INITIAL | SPARE INITIAL | SPARE INITIAL | |

FIG. 4A

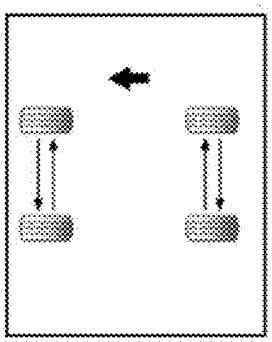

| Location | Initial | Initial +1 | Initial +2 | Initial +3 | Initial +4 | Initial +n |
|---|---|---|---|---|---|---|
| LEFT FRONT | LF INITIAL | RF INITIAL | LF INITIAL | RF INITIAL | LF INITIAL | |
| LEFT REAR | LR INITIAL | RR INITIAL | LR INITIAL | RR INITIAL | LR INITIAL | |
| RIGHT FRONT | RF INITIAL | LF INITIAL | RF INITIAL | LF INITIAL | RF INITIAL | |
| RIGHT REAR | RR INITIAL | LR INITIAL | RR INITIAL | LR INITIAL | RR INITIAL | |
| SPARE | SPARE INITIAL | SPARE INITIAL | SPARE INITIAL | SPARE INITIAL | SPARE INITIAL | |

FIG. 4B

| Location | Initial | Initial +1 | Initial +2 | Initial +3 | Initial +4 | Initial +n |
|---|---|---|---|---|---|---|
| LEFT FRONT | LF INITIAL | RF INITIAL | LF INITIAL | RR INITIAL | LF INITIAL | |
| LEFT REAR INSIDE | LR INSIDE INITIAL | RR INSIDE INITIAL | LR INSIDE INITIAL | RR INSIDE INITIAL | LR INSIDE INITIAL | |
| LEFT REAR OUTSIDE | LR OUTSIDE INITIAL | RR OUTSIDE INITIAL | LR OUTSIDE INITIAL | RR OUTSIDE INITIAL | LR OUTSIDE INITIAL | |
| RIGHT FRONT | RF INITIAL | LF INITIAL | RF INITIAL | LF INITIAL | RF INITIAL | |
| RIGHT REAR INSIDE | RR INSIDE INITIAL | LR INSIDE INITIAL | RR INSIDE INITIAL | LR INSIDE INITIAL | RR INSIDE INITIAL | |
| RIGHT REAR OUTSIDE | RR OUTSIDE INITIAL | LR OUTSIDE INITIAL | RR OUTSIDE INITIAL | LR OUTSIDE INITIAL | RR OUTSIDE INITIAL | |
| SPARE | SPARE INITIAL | SPARE INITIAL | SPARE INITIAL | SPARE INITIAL | SPARE INITIAL | |

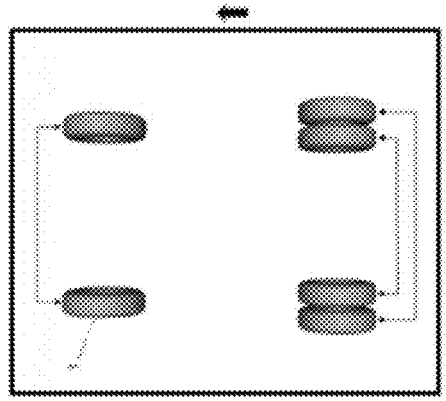

FIG. 4C

| Tire | LF Location | LR Location | RF Location | RR Location |
|---|---|---|---|---|
| *LF INITIAL* | cumulative miles | cumulative miles | cumulative miles | cumulative miles |
| *LR INITIAL* | cumulative miles | cumulative miles | cumulative miles | cumulative miles |
| *RF INITIAL* | cumulative miles | cumulative miles | cumulative miles | cumulative miles |
| *RR INITIAL* | cumulative miles | cumulative miles | cumulative miles | cumulative miles |
| *SPARE INITIAL* | cumulative miles | cumulative miles | cumulative miles | cumulative miles |

FIG. 5

TIRE PRESSURE MONITORING AND LOCATION SYSTEM WITH TIRE ROTATION SERVICE INDICATOR AND NEW LOCATION CONFIRMATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to tire pressure monitoring and location systems, and more particularly to tire pressure monitoring and location systems for monitoring tire pressure and rotation of tires.

Tire pressure monitoring systems are used to monitor tire pressure and/or tire temperature of each tire of a vehicle. Underinflated tires can lead to tire failure and/or contribute to tire disintegration, heat buildup, ply separation and/or sidewall/casing breakdowns. Tire rotation can be used to reduce differences in tire wear. Tire rotation involves repositioning the tires of the vehicle at predetermined mileage intervals.

Tire wear depends upon the location of the tire. For example, tires on the front of a front-wheel drive vehicle handle a larger proportion of the torque and friction due to turning, accelerating, and/or braking forces. Benefits of tire rotation include spreading wear evenly across all four tires to maximize tread life. Even tread wear keeps the tread depth of the tires more uniform, which can help keep traction and handling consistent across all four tires. Even tire wear also improves cornering and braking performance. For all-wheel-drive vehicles, evenly worn tires lower stress on the drivetrain and/or reduce wear on expensive powertrain components.

The tires are typically rotated using a specific tire rotation map. The tire rotation map for a vehicle depends upon several factors such as the number of tires (e.g., 4, 6 or more), the type of tire (e.g., directional or non-directional tires, staggered or non-staggered, etc.), the vehicle configuration (front, rear, all, or four-wheel drive), and/or whether or not the vehicle includes a full-size spare tire.

SUMMARY

A tire pressure and location monitoring system includes N tire pressure sensors associated with N tires of a vehicle, where N is an integer greater than one. A tire pressure and location monitoring system is configured to communicate with the N tire pressure sensors, store a tire rotation map, and determine whether new locations of the N tires, including the N tire pressure sensors, on the vehicle are correct after a tire rotation is performed based on the tire rotation map.

In other features, the tire pressure and location monitoring system is configured to receive measured tire pressure signals from the N tire pressure sensors. The tire pressure and location monitoring system is configured to store an initial location and an identification of the N tire pressure sensors. The tire pressure and location monitoring system is configured to track mileage for the N tires corresponding to the N tire pressure sensors. The tire pressure and location monitoring system is configured to generate a message when at least one of the N tires exceeds a predetermined mileage threshold.

In other features, the tire pressure and location monitoring system is configured to compare the new locations of the N tire pressure sensors after rotation to next locations specified by the tire rotation map. The tire pressure and location monitoring system is further configured to turn off the message when the new locations of the N tire pressure sensors match next locations specified by the tire rotation map. The tire pressure and location monitoring system is further configured to generate an error message when new locations of the N tire pressure sensors do not match next locations for the N tire pressure sensors specified by the tire rotation map.

In other features, the tire pressure and location monitoring system is configured to receive measured tire pressure signals from the N tire pressure sensors, store an initial location and identification of the N tire pressure sensors, track mileage for the N tires corresponding to the N tire pressure sensors, generate a message when at least one of the N tires exceeds a predetermined mileage threshold, and compare new locations of the N tire pressure sensors after rotation to next locations specified by the tire rotation map. The new locations of the N tires are received from one of a service tool and a telematics system.

A method for monitoring tire pressure and location on a vehicle, includes providing N tire pressure sensors for N tires of a vehicle, where N is an integer greater than one; using a tire pressure monitoring and location system, receiving data from the N tire pressure sensors; storing a tire rotation map for the N tire pressure sensors; and determining whether new locations of the N tires, including the N tire pressure sensors, on the vehicle are correct after a tire rotation is performed based on the tire rotation map.

In other features, the method includes receiving measured tire pressure signals from the N tire pressure sensors. The method includes storing an initial location and an identification of the N tire pressure sensors. The method includes tracking mileage for the N tires corresponding to the N tire pressure sensors. The method includes generating a message when at least one of the N tires exceeds a predetermined mileage threshold.

In other features, the method includes comparing the new locations of the N tire pressure sensors after rotation to next locations specified by a tire rotation map. The method includes turning off the message when the new locations of the N tire pressure sensors match next locations specified by the tire rotation map. The method includes generating an error message when new locations of the N tire pressure sensors do not match the next locations for the N tire pressure sensors specified by the tire rotation map.

In other features, the method includes receiving measured tire pressure signals from the N tire pressure sensors; storing an initial location and identification of the N tire pressure sensors; tracking mileage for the N tires corresponding to the N tire pressure sensors; generating a message when at least one of the N tires exceeds a predetermined mileage threshold; and comparing the new locations of the N tire pressure sensors after rotation to next locations specified by the tire rotation map.

In other features, the method includes receiving the new locations of the N tires from one of a service tool and a telematics system.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 4A to 4C are examples of tire rotation maps and tables according to the present disclosure; and FIG. 5 is an example of a mileage table storing cumulative miles for each tire at each vehicle location.

In the drawings, reference numbers may be reused to identify similar and/or identical elements.

DETAILED DESCRIPTION

Most manufacturers recommend rotating tires of a vehicle at predetermined mileage intervals. However, it is difficult to determine whether the tire rotations have been performed and/or, if performed, whether or not the new locations correspond to next locations in a tire rotation map.

The tire pressure monitoring and location system according to the present disclosure monitors the cumulative mileage of each tire at initial and subsequent locations on the vehicle (such as right front, left front, right rear, and left rear). When the tire exceeds a predetermined mileage threshold at a given location, the tire pressure and location monitoring system generate a message to instruct the owner to rotate the tires. The tires are rotated and then the tire pressure and location monitoring system ensures that the new locations are the correct locations based on the prior locations and a tire rotation map.

Figure 1:
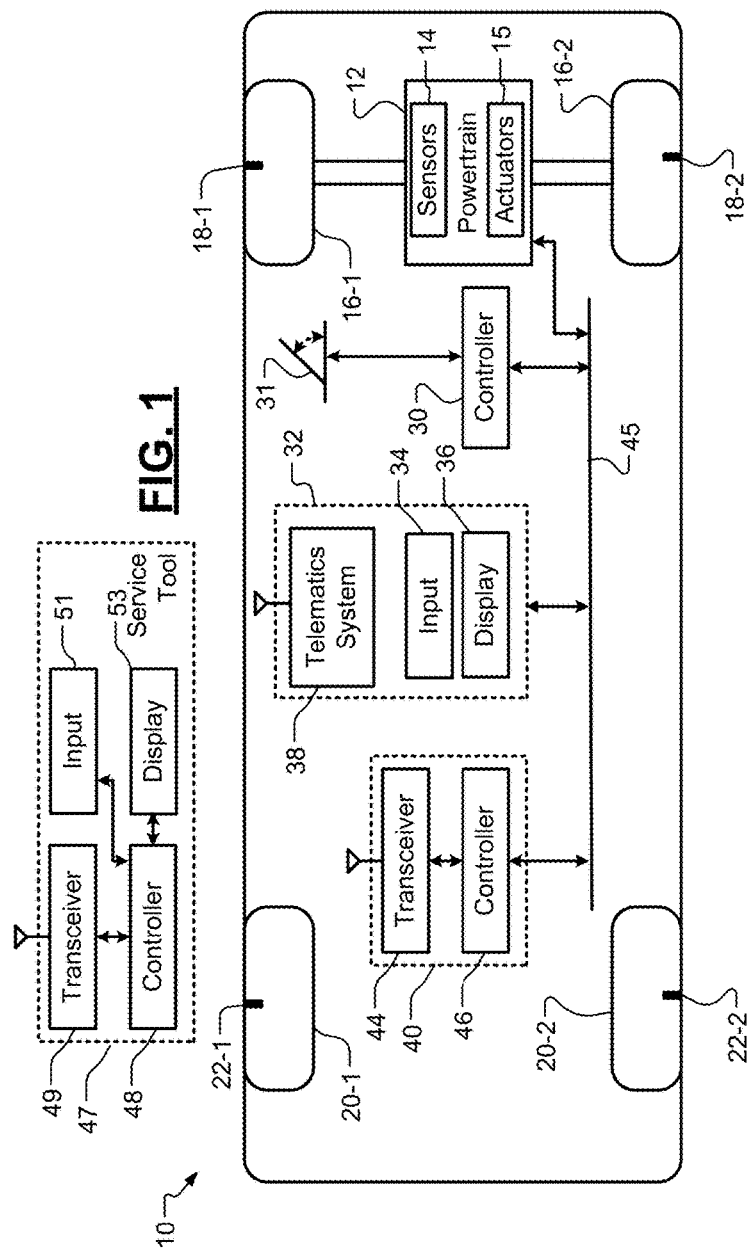
FIG. 1 is a functional block diagram of an example of a vehicle including a tire pressure monitoring and location system according to the present disclosure.

Referring now to FIG. 1, a vehicle 10 including a tire pressure monitoring and location system is shown. The vehicle 10 includes a powertrain 12 (e.g., including an internal combustion engine (ICE) and a transmission, or an electric motor with or without a transmission), sensors 14 and actuators 15. The sensors 14 monitor parameters such as voltages, currents, resistances, temperatures, pressures, rotational speeds and/or other parameters. The actuators 15 are used to adjust operation of components of the powertrain 12.

The powertrain 12 provides torque to rotate one or both front tires 16-1, 16-2 and/or one or both rear tires 20-1, 20-2. The front tires 16-1, 16-2 include tire pressure sensors 18-1, 18-2 (collectively or individually tire pressure sensors 18) and the rear tires 20-1, 20-2 include tire pressure sensors 22-1, 22-2, respectively, (collectively or individually tire pressure sensors 22). In some examples, the tire pressure sensors 16, 22 are integrated with valve stems of the corresponding tires, although other types of tire pressure sensors can be used.

The vehicle further includes a controller 30 that receives driver inputs from one or more input devices 31 (such as a cruise control system, an autonomous driving system, an accelerator pedal, brakes, and/or steering wheel). The controller controls the powertrain 12 in response thereto.

An infotainment system 32 includes an input 34 (such as buttons), a display 36 (such as a touch screen), and a telematics system 38. The telematics system 38 includes a transceiver (not shown) communicates data via cellular and/or satellite networks to/from a manufacturer.

A tire pressure and location monitoring system 40 includes a transceiver 44 and a controller 46. The transceiver 44 receives data such as tire pressure, ID, and/or tire temperatures from the tire pressure sensors. Various components of the vehicle 10 communicate with each other via a vehicle data bus 45 such as a controller area network (CAN) bus.

In some examples described below, a service tool 47 may be used to identify current and/or new locations of the tire pressure sensors. The service tool 47 includes a controller 48, a transceiver 49, an input device 51 and a display 53 that can be used to read the tire pressure sensors, an identification (ID) number of the tire pressure sensor, and/or measured values such as tire pressure and/or temperature of the corresponding tire.

Figure 2:
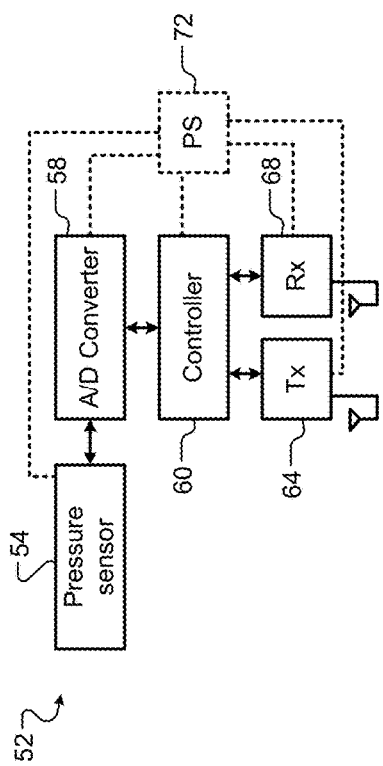
FIG. 2 is a functional block diagram of an example of a tire pressure sensor according to the present disclosure.

Referring now to FIG. 2, a tire pressure sensor 52 is shown. The tire pressure sensor 52 includes a pressure sensor 54 that communicates with an analog to digital (A/D) converter 58. The A/D converter 58 converts the measured tire pressure to a digital value and outputs the digital value to a controller 60. The controller 60 communicates with a transmitter 64 and/or a receiver 68. The controller 60 causes the transmitter 64 to transmit the tire pressure sensor ID, the tire pressure and/or tire temperature to the vehicle 10 or another device.

In some examples, a power supply (PS) 72 such as a battery provides power to components of the tire pressure sensor 52. In other examples, mechanical energy during rotation of the tires is used to generate power for the tire pressure sensors while the tire is spinning.

In other examples, other techniques such as those used for radio frequency identification (RFID) tags are used. In RFID applications, the antenna of the receiver at the tire pressure sensor is used to absorb RF power from an excitation signal generated by a remote transmitter of an interrogating device (e.g., the service tool or the tire pressure and location monitoring system). The absorbed power is used to temporarily power the tire pressure sensor and to make a measurement such as pressure and/or temperature. Then the measured data and/or the ID of the tire pressure sensor are transmitted to a remote receiver.

Figure 3:
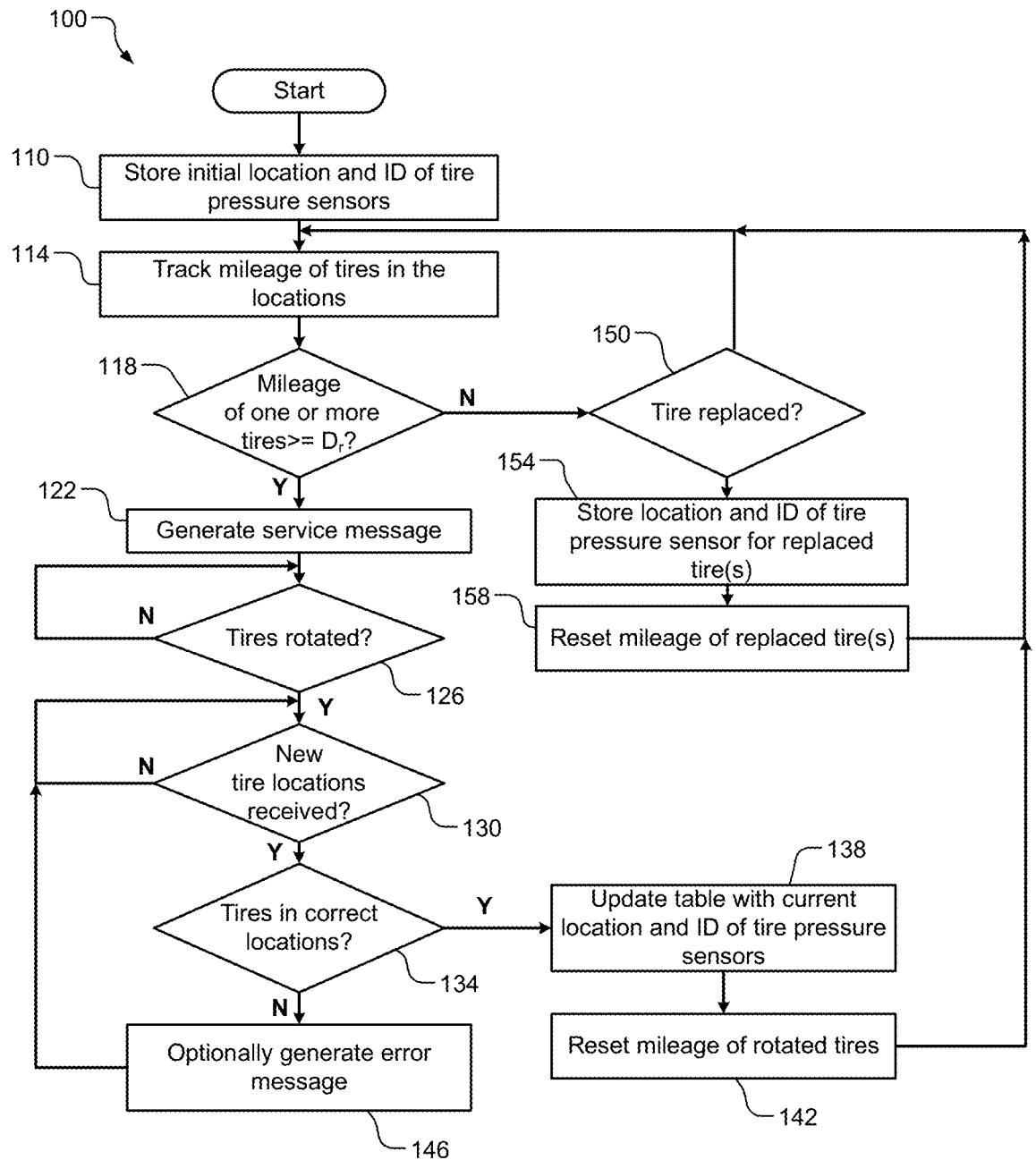
FIG. 3 is a flowchart of an example of a method for operating the tire pressure monitoring and location system according to the present disclosure.

Referring now to FIG. 3, a method 100 for operating the tire pressure and location monitoring system is shown. At 110, the initial location and ID of the tire pressure sensors are stored in memory. At 114, the mileage of the tires at the current location is tracked. At 118, the method determines whether the mileage of one or more of the tires is greater than a predetermined mileage threshold (Dr). In some examples, the predetermined mileage threshold Dr corresponds to 3000, 4000, 5000, 6000 or 7500 miles, although other values can be used.

If 118 is true, a service message is generated at 122. In some examples, the display of the vehicle may indicate "Maintenance Required" and/or "Tire Rotation Needed". At 126, the method determines whether the tires have been rotated. If 126 is false, the method returns to 126. If 126 is true, the method determines whether the new tire locations have been received at 130.

If 130 is false, the method returns to 130. If 130 is true, the method continues at 134 and determines whether the tires are in the correct tire locations relative to the preceding tire locations. If 134 is true, the method updates the table with current location and identification of the tire pressure sensors at 138. At 142, the method resets the mileage corresponding to the rotated tires.

If 134 is false, the method generates an error message and/or identifies corrective action. For example, the display may be used to identify the locations of the tires that need to be moved and the desired locations for the tires that is consistent with the tire rotation map. If 118 is false (none of the tires exceed the predetermined mileage threshold Dr), the method determines whether one or more tires have been replaced at 150. If 150 is false, the method returns to 114. If 150 is true, the method stores the location(s) and ID(s) of the tire pressure sensor(s) for the replaced tire(s) at 154. At 158, the method resets the mileage of the replaced tire(s).

Referring now to FIGS. 4A to 5, examples of tire rotation maps and tire location tables are shown. If FIG. 4A, a first example tire rotation map is shown for a vehicle including four tires having the same size and a space saver spare. A location table keeps track of the initial location and the location for each tire rotation thereafter. In some examples, the controller deletes data for a replaced tire (in other examples, the data is archived). If FIG. 4B, a second example tire rotation map is shown for a vehicle including four tires having staggered front and rear tire sizes and a space saver spare. A table keeps track of the initial location and each tire rotation thereafter.

As can be appreciated, the tire pressure and location monitoring system can be used with vehicles having more than four tires. In FIG. 4C, a third example tire rotation map is shown for a vehicle including two front and four rear tires and a space saver spare. The front tires are swapped from side to side and the rear tires are swapped from side to side. In FIG. 5, a table stores cumulative miles for each tire in each of the vehicle locations.

The current locations of the tire pressure sensors can be determined in a variety of ways. In some examples, the vehicle includes a transmitter that interrogates each tire pressure sensor and uses a directional antenna to identify the position (LF, LR, RF, RR) of the tire pressure sensors relative to the vehicle (e.g., in a manner similar to keyless entry systems identification of location of key fobs).

In other examples, the service tool 47 is used. In a first example, the service tool 47 learns the locations and IDs of the tire pressure sensors 18, 22 without wirelessly transmitting RF data between the tire pressure sensors 18, 22 and the vehicle. When using the service tool 47, each tire pressure sensor ID is learned by the service tool 47 and stored internally. The service tool 47 is then connected to the vehicle bus or an OBD2 interface of the vehicle 10. In other examples, the data is sent to the manufacturer and then the manufacturer sends the data to the vehicle using the telematics system. The tire pressure sensor location and ID data stored in the service tool 47 are loaded into the controller 46.

Using the service tool 47 to learn locations and IDs of the tire pressure sensors 18, 22 prevents the vehicle from learning errant data from nearby tire pressure sensors associated with other vehicles in a service facility environment (e.g., especially when the tire pressure sensor batteries are low).

After turning on the service tool 47, the technician selects an option corresponding to reading the tire pressure sensors 18, 22 of the vehicle 10. In some examples, a QR code on a vehicle tire placard or certification label is scanned to identify the vehicle 10. If the QR is not available, the service tool 47 allows the technician to input vehicle make, model, vehicle identification number or other information.

After identifying the vehicle 10, the service tool 47 is arranged near one of the tire pressure sensors 18, 22 (e.g., against a tire sidewall near a valve stem) in the order of location identified by the service tool 47 (or a predetermined order).

If any of the tire pressure sensors does not respond after two or more attempts, the tire pressure sensor can be replaced. The technician determines whether the pressure and temperature values are correct based on the ambient conditions and actual tire pressure. If either value is inaccurate, the tire pressure sensor can be replaced and the procedure can be repeated with the new tire pressure sensor.

After reading the tire pressure sensors, the service tool 47 is connected to the vehicle (e.g., the service tool 47 is connected to the OBD2 interface) and the locations and IDs of the tire pressure sensors are transmitted to the vehicle 10 (or the telematics system).

In other examples, the service tool 47 produces a low frequency transmission signal to activate the tire pressure sensors 18, 22 in a particular order identified by the service tool 47. The tire pressure sensors 18, 22 respond to the low frequency activation by transmitting in a remotely triggered learn mode. When the controller 46 receives a learn mode transmission while in learn mode, the controller assigns the ID of the tire pressure sensor to the corresponding location on the vehicle 10.

In some examples, vehicle input devices are used to enter a tire pressure learning mode. In some examples, a horn of the vehicle chirps, a message is displayed, and/or turn signals or headlights are flashed and/or illuminated. Starting with a predetermined tire location (e.g., the left front tire), the tire pressure sensor is activated by holding the antenna of the tire pressure monitor activation tool aimed upward against the tire sidewall close to the wheel rim at the valve stem location and activation is initiated. If successful, the vehicle can chirp the horn and/or flash a light, the sensor information is learned and a turn signal in the next location can be flashed or illuminated. When all of the tire pressure sensors are done, the learn process is complete and the controller exits the learning mode.

In still other examples, the vehicle is placed in a maintenance mode and each tire pressor sensor is reset sequentially. The tire pressure of a tire arranged at a predetermined or specified location is decreased by a predetermined pressure (e.g., greater than 3 psi) to identify a location of the corresponding tire pressure sensor and the process is repeated for other tire pressure sensors. Audible or visual feedback can be provided using a horn or flashing lights when the position of the tire pressure sensor is updated.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A tire pressure and location monitoring system comprising:
N tire pressure sensors associated with N tires of a vehicle, where N is an integer greater than one;
a display; and
a tire pressure and location monitoring system in communication with the display, the tire pressure and location monitoring system configured to:
communicate with the N tire pressure sensors;
store a tire rotation map;

determine whether new locations of the N tires, including the N tire pressure sensors, on the vehicle are correct after a tire rotation is performed based on the tire rotation map;

compare the new locations of the N tire pressure sensors after rotation to next locations specified by the tire rotation map; and generate an error message when the new locations of the N tire pressure sensors do not match next locations for the N tire pressure sensors specified by the tire rotation map, the error message including each of the new locations of the N tires which need to be moved and desired locations for the N tires that is consistent with the tire rotation map, wherein the display is configured to identify each of the new locations of the N tires which need to be moved and desired locations for the N tires that is consistent with the tire rotation map.

2. The tire pressure and location monitoring system of claim 1, wherein the tire pressure and location monitoring system is configured to receive measured tire pressure signals from the N tire pressure sensors.

3. The tire pressure and location monitoring system of claim 1, wherein the tire pressure and location monitoring system is configured to store an initial location and an identification of the N tire pressure sensors.

4. The tire pressure and location monitoring system of claim 1, wherein the tire pressure and location monitoring system is configured to track mileage for the N tires corresponding to the N tire pressure sensors.

5. The tire pressure and location monitoring system of claim 1, wherein the tire pressure and location monitoring system is configured to:

receive measured tire pressure signals from the N tire pressure sensors;

store an initial location and identification of the N tire pressure sensors;

track mileage for the N tires corresponding to the N tire pressure sensors; and generate a message when at least one of the N tires exceeds a predetermined mileage threshold.

6. The tire pressure and location monitoring system of claim 1, wherein the new locations of the N tires are received from one of a service tool and a telematics system.

7. The tire pressure and location monitoring system of claim 1, wherein the tire pressure and location monitoring system is configured to generate a message when at least one of the N tires exceeds a predetermined mileage threshold.

8. The tire pressure and location monitoring system of claim 7, wherein the tire pressure and location monitoring system is further configured to turn off the message when the new locations of the N tire pressure sensors match next locations specified by the tire rotation map.

9. The tire pressure and location monitoring system of claim 1, further comprising a service tool configured to learn the new locations of the N tire pressure sensors.

10. The tire pressure and location monitoring system of claim 9, wherein the service tool is configured to transmit the new locations of the N tire pressure sensors to the tire pressure and location monitoring system.

11. The tire pressure and location monitoring system of claim 9, wherein the service tool is configured to learn the new locations of the N tire pressure sensors without wirelessly transmitting data between the N tire pressure sensors and the vehicle.

12. The tire pressure and location monitoring system of claim 9, further comprising a telematics system configured to receive the new locations of the N tire pressure sensors learned by the service tool and transmit the new locations of the N tire pressure sensors to the tire pressure and location monitoring system.

13. A method for monitoring tire pressure and location on a vehicle, comprising:

providing N tire pressure sensors for N tires of a vehicle, where N is an integer greater than one;

using a tire pressure monitoring and location system:
receiving data from the N tire pressure sensors;
storing a tire rotation map for the N tire pressure sensors;
determining whether new locations of the N tires, including the N tire pressure sensors, on the vehicle are correct after a tire rotation is performed based on the tire rotation map;
comparing the new locations of the N tire pressure sensors after rotation to next locations specified by the tire rotation map; and
generating an error message when new locations of the N tire pressure sensors do not match next locations for the N tire pressure sensors specified by the tire rotation map, the error message including each of the new locations of the N tires which need to be moved and desired locations for the N tires that is consistent with the tire rotation map; and identifying, on a display, each of the new locations of the N tires which need to be moved and desired locations for the N tires that is consistent with the tire rotation map.

14. The method of claim 13, further comprising receiving measured tire pressure signals from the N tire pressure sensors.

15. The method of claim 13, further comprising storing an initial location and an identification of the N tire pressure sensors.

16. The method of claim 13, further comprising tracking mileage for the N tires corresponding to the N tire pressure sensors.

17. The method of claim 13, further comprising:
receiving measured tire pressure signals from the N tire pressure sensors;
storing an initial location and identification of the N tire pressure sensors;
tracking mileage for the N tires corresponding to the N tire pressure sensors; and
generating a message when at least one of the N tires exceeds a predetermined mileage threshold.

18. The method of claim 13, further comprising receiving the new locations of the N tires from one of a service tool and a telematics system.

19. The method of claim 13, further comprising generating a message when at least one of the N tires exceeds a predetermined mileage threshold.

20. The method of claim 19, further comprising turning off the message when the new locations of the N tire pressure sensors match next locations specified by the tire rotation map.

* * * * *